United States Patent [19]
Kohn

[11] Patent Number: 5,157,388
[45] Date of Patent: Oct. 20, 1992

[54] METHOD AND APPARATUS FOR GRAPHICS DATA INTERPOLATION

[75] Inventor: Leslie D. Kohn, San Jose, Calif.

[73] Assignee: Intel Corporation, Santa Clara, Calif.

[21] Appl. No.: 679,442

[22] Filed: Apr. 2, 1991

Related U.S. Application Data

[63] Continuation of Ser. No. 311,240, Feb. 14, 1989, abandoned.

[51] Int. Cl.⁵ .................................... G09G 5/00
[52] U.S. Cl. .................... 340/800; 340/798; 340/728; 395/162; 364/723
[58] Field of Search ............ 340/728, 729, 701, 703, 340/798, 800; 364/715.01, 723, 765, 521, 522; 395/162

[56] References Cited

U.S. PATENT DOCUMENTS

| | | | |
|---|---|---|---|
| 4,113,361 | 9/1978 | Nakano | 340/800 |
| 4,733,230 | 3/1988 | Kurihara et al. | 340/703 |
| 4,797,849 | 1/1989 | Nakano | 364/765 |
| 4,894,776 | 1/1990 | Dekel | 340/728 |

*Primary Examiner*—Jeffery A. Brier
*Attorney, Agent, or Firm*—Blakely, Sokoloff, Taylor & Zafman

[57] ABSTRACT

Special purpose graphics instructions are provided to implement linear interpolation of pixel attributes such as a distance (Z) value or color intensity. Multiple fixed-point real number additions are performed in parallel in a 64-bit adder. The real number sums are truncated upon being loaded in a MERGE register, the contents of which are then shifted. By performing two or more of such instructions consecutively, multiple interpolated values are accumulated in the MERGE register.

6 Claims, 4 Drawing Sheets

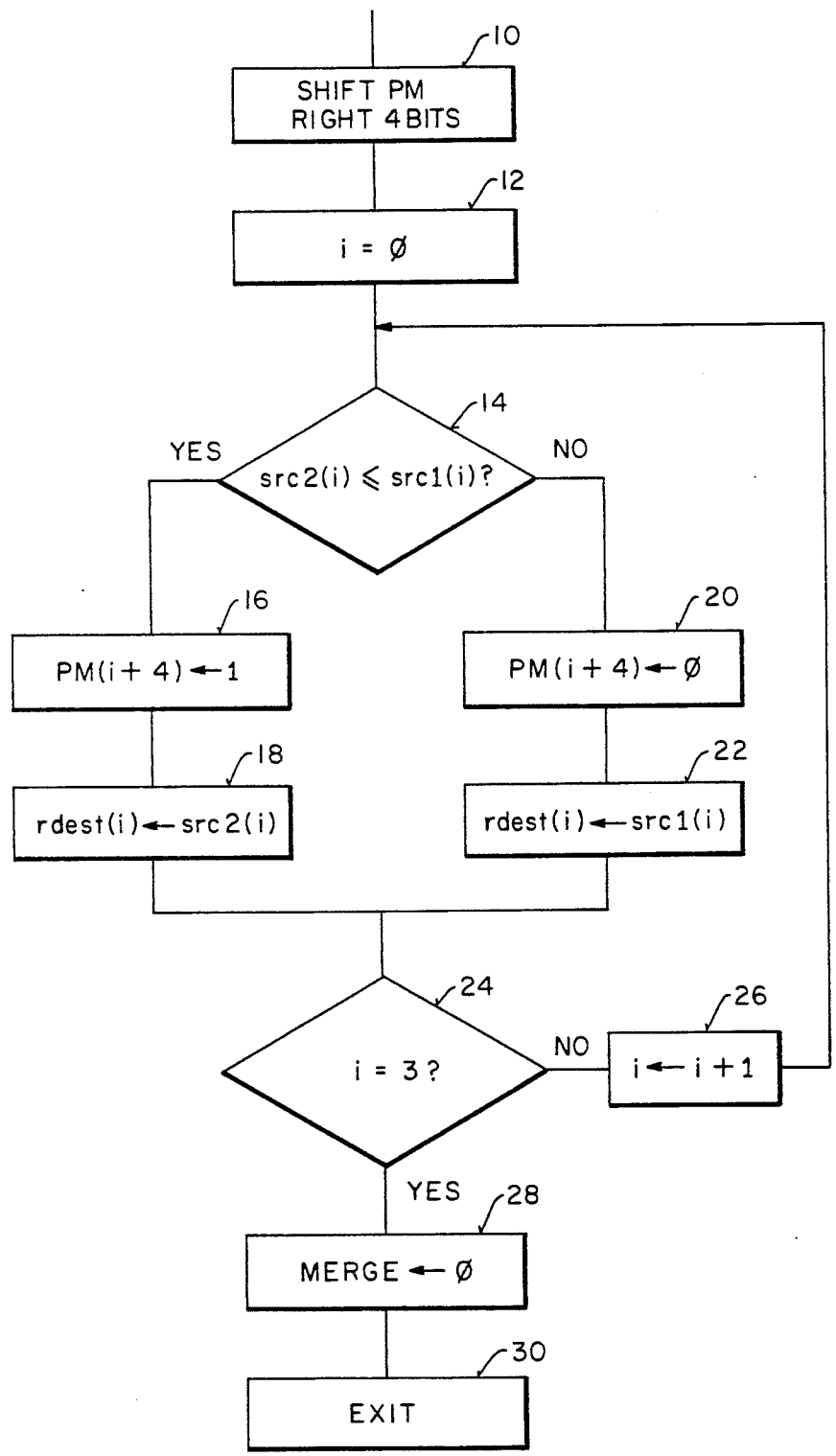
FIG _ 1

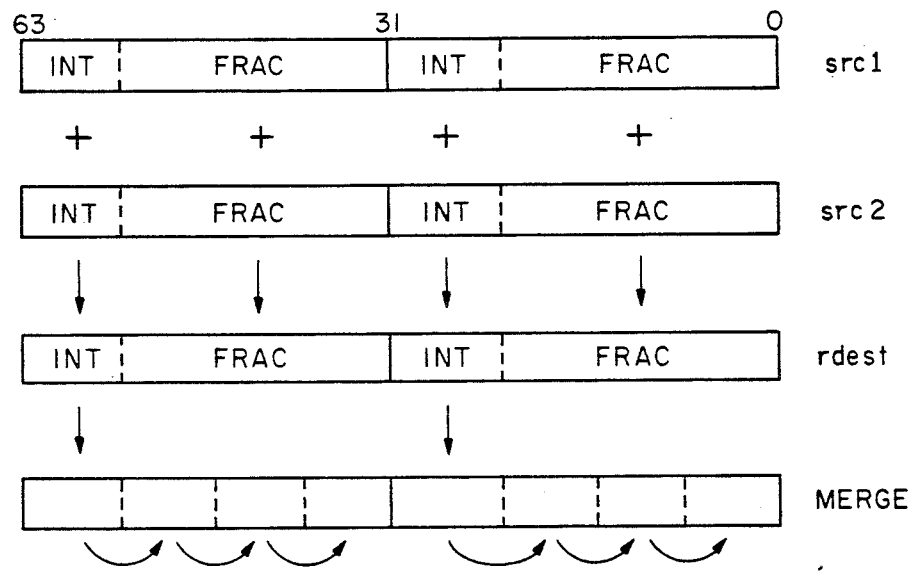
FIG_3C
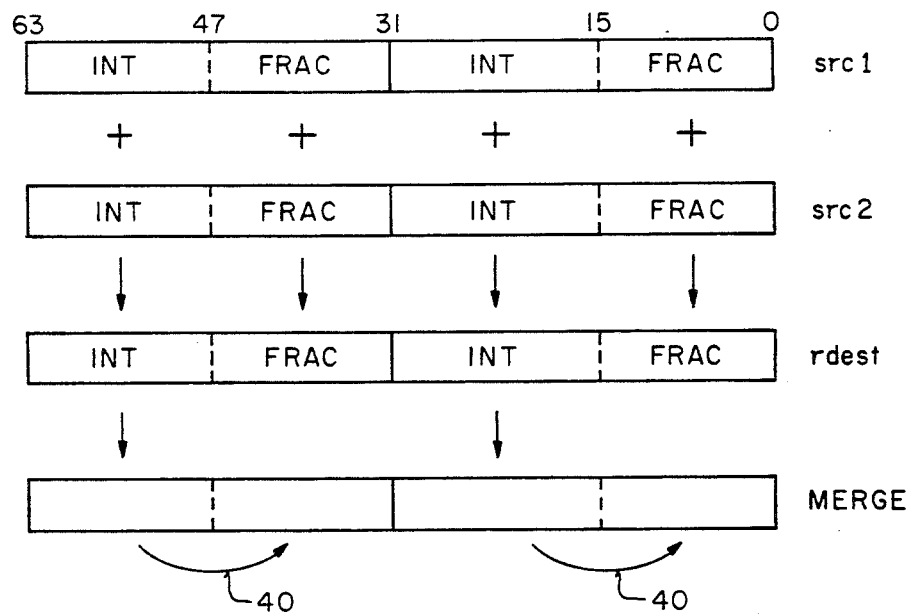
FIG_2

FIG_3A
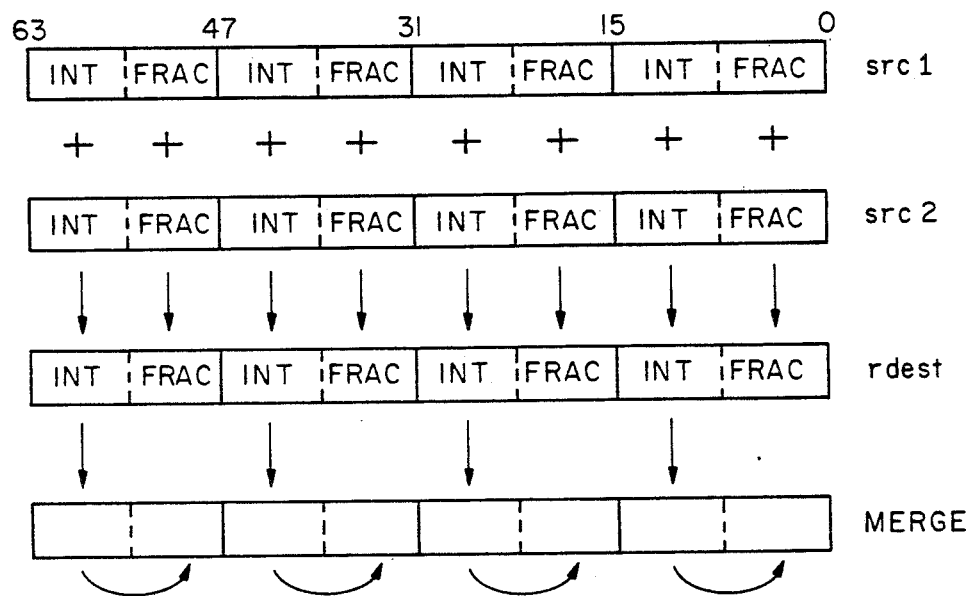
FIG_3B
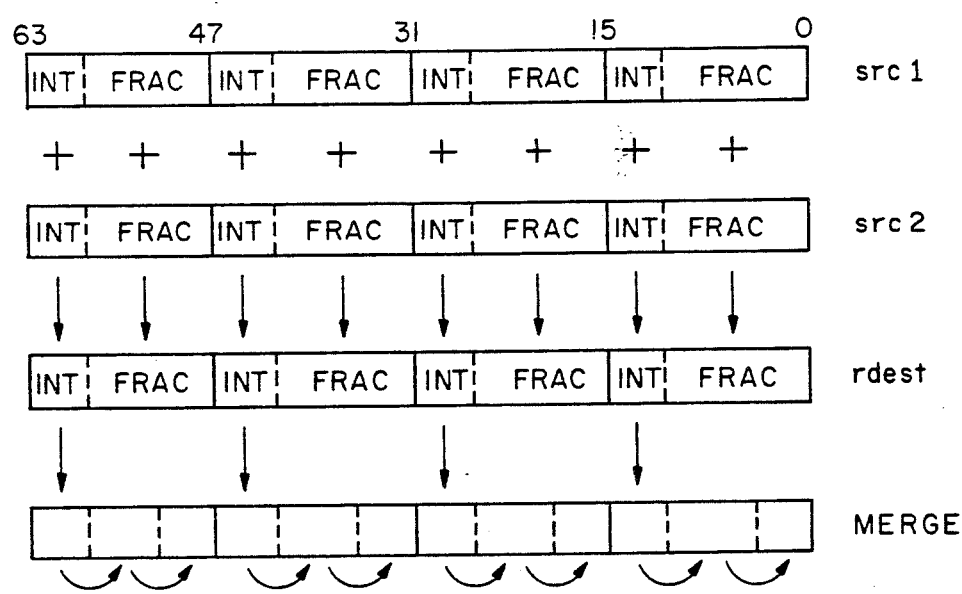

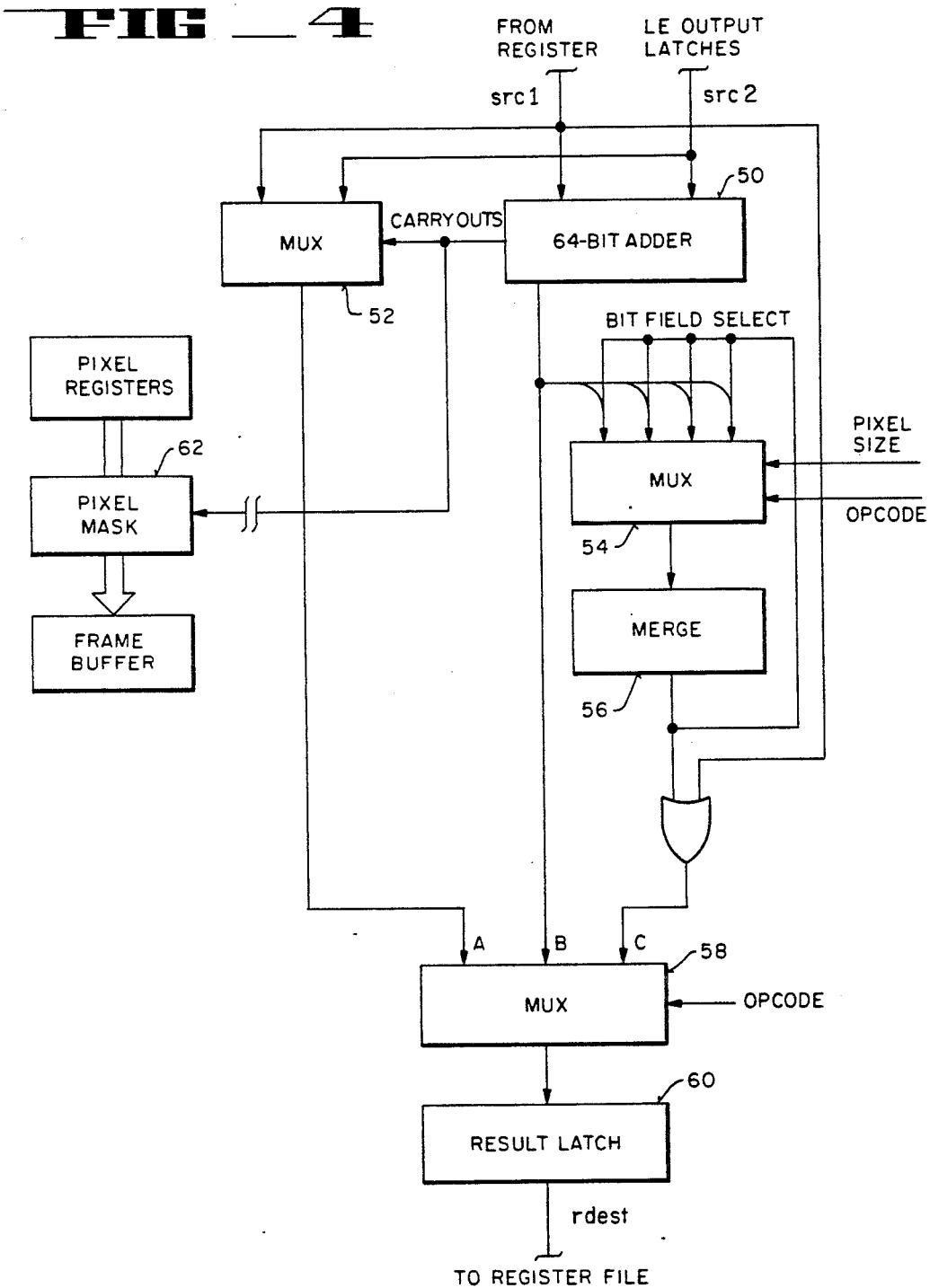
FIG_4

METHOD AND APPARATUS FOR GRAPHICS DATA INTERPOLATION

This is a continuation of application Ser. No. 311,240, filed Feb. 14, 1989 now abandoned.

FIELD OF THE INVENTION

This invention relates to the field of graphics processing. More particularly, it relates to a method and apparatus for accelerating the computation of pixel data for rendering shaded, three-dimensional graphic images in a software-driven, pipelined graphics processor.

BACKGROUND ART

Advances in the development of high-speed digital computers have made practical the display of three-dimensional (3-D) graphics images in real time. Systems providing such display capabilities have found wide applications in fields such as engineering workstations, real-time simulators and cinematographic animation, to name only a few.

Demands for higher quality renderings of more complicated images have required ever greater computational throughput. Whereas early computer graphics systems were often barely able to provide a shaded, colored image of a simple geometric solid with hidden lines removed, it is now possible to provide high-resolution images of computer generated representations of very complicated objects such as, for example, a human figure.

Such advances have been made possible both by higher computational rates afford by very large scale integrated (VLSI) circuits and by more efficient graphics processing algorithms. Despite such advances in graphics systems technology, state-of-the-art graphics systems remain constrained in their ability to provide high-quality real-time imagery. General purpose processors typically sacrifice image quality in order to achieve real-time operation. Alternatively, very high quality images can be generated, but without real time animation. Thus, dedicated graphics processors comprising special purpose hardware optimized to perform the various 3-D graphics operations such as vector manipulation, hidden surface elimination, shading, etc. have been developed. While providing high levels of performance, such dedicated graphics processors are expensive and lack the versatility of a general purpose processor.

A need therefore exists for a high-performance, graphics oriented processor capable of supporting a sustained high computation rate, but wherein 3-D graphics is largely implemented in software.

SUMMARY OF THE INVENTION

The present invention is directed to a method and apparatus for providing a software-implemented 3-D graphics pipeline in a VLSI processor. A portion of a single chip processor is physically dedicated to graphics oriented processing, and a set of graphics oriented instructions are provided that substantially accelerate the graphics pipeline throughput.

In one aspect of the invention, instructions are provided to facilitate hidden surface elimination. A Z-buffer check instruction performs multiple, simultaneous unsigned-integer (ordinal) comparisons of newly computed distance (Z) values with the contents of a Z-buffer. Distances of points to be drawn are compared with corresponding values in the Z-buffer, and appropriate bits of a pixel mask are then set to designate those pixels for which the points to be drawn are closer (smaller) than the Z-buffer values. Previously calculated bits of the pixel mask are shifted so that consecutive Z-buffer check instructions accumulate their results in the pixel mask register. For 16-bit Z values, four comparisons and pixel mask updates are concurrently performed in a single instruction cycle. A pixel store instruction utilizes the pixel mask to update only those pixel locations in a frame buffer which correspond to a point on a newly rendered surface closer than the surface represented by the current pixel value.

In another aspect of the present invention, an instruction is provided to implement linear interpolation of distance values such as those that are stored in the Z-buffer. Two 32-bit fixed-point real number additions are performed in parallel. The real number sums are truncated to 16 bits upon being loaded in a MERGE register, the contents of which are then shifted right by 16 bits. By performing two such Z-buffer add instructions consecutively, a total of four 16-bit interpolated Z values are accumulated in the MERGE register.

In yet another aspect of the present invention, an instruction is provided to implement interpolation of pixel color intensities. This pixel add instruction operates in a manner similar to the Z-buffer add instruction in that multiple fixed-point real number additions are performed in parallel. The pixel add instruction operates with 8-, 16- and 32-bit pixel formats.

With an 8-bit pixel format in which only a single color intensity is represented, four 16-bit real number additions are performed in parallel, each 16-bit number having an 8-bit integer portion. The real number sums are truncated to 8 bits upon loading in the MERGE register, whose contents are shifted right by 8 bits during each instruction. By performing two such pixel add instructions consecutively, eight 8-bit interpolated pixels are accumulated in the MERGE register.

With a 16-bit pixel format, each of three color intensities is represented by 6, 6 and 4 bits, respectively. As with 8-bit pixels, four 16-bit real number additions are performed in parallel, however, the integer portions comprise 6 rather than 8 bits. The real number sums are truncated to 6 bits upon loading in the MERGE register, whose contents are shifted right by 6 bits during each instruction. By performing three such pixel add instructions consecutively, one for each color, four 16-bit interpolated pixels are accumulated in the MERGE register.

With a 32-bit pixel format, the pixel add instruction performs two 32-bit real number additions in parallel, each real number having an 8-bit integer portion. Results are truncated to 8 bits and the MERGE register is shifted right by 8 bits in each instruction. Three such instructions, one for each color, accumulates two 32-bit interpolated pixels.

BRIEF DESCRIPTION OF THE DRAWINGS

FIG. 1 is a functional flow diagram conceptually illustrating the operation of a Z-buffer check instruction according to the present invention.

FIG. 2 is a diagrammatic illustration of the operation of a Z-buffer add instruction according to the present invention.

FIG. 3a is a diagrammatic illustration of the operation of an 8-bit pixel add instruction according to the present invention.

FIG. 3b is a diagrammatic illustration of the operation of a 16-bit pixel add instruction according to the present invention.

FIG. 3c is a diagrammatic illustration of the operation of a 32-bit pixel add instruction according to the present invention.

FIG. 4 is a functional block diagram of a graphics processor according to the present invention.

NOTATION AND NOMENCLATURE

The detailed description which follows is presented largely in terms of algorithms and symbolic representations of operations on data bits within a computational device. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities. Further, the manipulations performed are also referred to in terms, such as adding or comparing, which are commonly associated with mental operations performed by a human operator. No such capability of a human operator is necessary, or desirable in most cases, in any of the operations described herein which form part of the present invention; the operations are machine operations. While the present invention is most advantageously applied in a microprocessor, other useful machines for performing the operations of the present invention may include general purpose digital computers and similar devices. In all cases, the distinction between the method operations and operating a computer and the method of computation itself should be noted. The present invention relates, in part, to method steps for operating the processor and thereby process electrical signals to generate other desired electrical signals.

DETAILED DESCRIPTION OF THE INVENTION

In the following description, for purposes of explanation and not limitation, specific data representations, bit assignments, sequences of operations, etc. are set forth in order to provide a thorough understanding of the present invention. However, it will be apparent to one skilled in the art that the present invention may be practiced without these specific details. In other instances detailed descriptions of well known graphic processing hardware, techniques and algorithms are omitted so as not to obscure the present invention.

The present invention supports high performance 3-D graphics applications by providing special purpose operations that assist in performing hidden surface elimination, distance interpolation and 3-D shading using intensity interpolation. The foregoing functions are commonly performed in graphics processors as is well known in the art. The basic methodology and algorithms for performing these functions are well known and will not be described at length herein.

The interpolation operations of the present invention support graphics applications in which the surface of a solid object to be rendered is approximated by a set of interconnected polygons. The distances and color intensities of the vertices of each of the polygons are presumed to be known, but the distances and intensities of other points within each polygon must be calculated by interpolation between the known values.

The method steps of the present invention are conveniently described and implemented as instructions executed in a microprocessor. In a preferred embodiment, the processor operates on 64-bit data words. The instructions described herein may operate on as many as two data words obtained from addressable register sources. The source operands are denoted generally as src1 and src2. The instructions likewise return the results of their operations to an addressable register destination denoted generally as rdest.

The present invention operates with pixel formats of 8-, 16-or 32-bits. With 8-bit pixels, up to 8 bits can be used to represent pixel intensity. The remaining bits, if any, can be used to represent any other pixel attribute, such as color. Intensity bits must be the low-order bits of the pixel.

With 16-bit pixels, there are three intensity attribute fields comprising 6, 6 and 4 bits respectively. These fields are generally associated with the three primary display colors: red, green and blue. However, the fields may be assigned to colors, or to any other pixel attributes, in any order that is convenient to the particular application.

With 32-bit pixels, four 8-bit fields are provided which may represent any four attributes. For example, the three higher order fields may be used for the three primary colors and the lowest order field may be used for an additional attribute, such as texture.

Z BUFFER CHECK

3-D graphics processing typically employs a Z-buffer which facilitates hidden surface elimination by associating with each pixel a value that represents the distance of that pixel from the viewer. When painting the point at a specific pixel location, three dimensional drawing algorithms calculate the distance of the point from the viewer. If the point is farther from the viewer than the point that is already represented by the pixel, the pixel is not updated. The present invention provides a Z-buffer check instruction which, within a single clock cycle, compares multiple Z-values, selects the closer (smaller) values, computes a new set of Z-values and updates a pixel mask. The pixel mask register is used when storing pixel data in the frame buffer so that only those pixels which are closer than the ones which have already been drawn are updated.

The Z-buffer check instruction performs multiple unsigned integer comparisons. The inputs to the instruction are normally taken from two arrays of values, each of which typically represents the distance of a point from the viewer. One array contains distances that correspond to points that are to be drawn, the other contains distances that correspond to points that have already been drawn (i.e. the Z-buffer). The instruction compares the distances of the points to be drawn against the values in the Z-buffer and sets bits of a pixel mask to indicate which distances are smaller than those presently in the Z-buffer. Previously calculated bits in the pixel mask are shifted right so that consecutive instructions accumulate their results in the pixel mask. The contents of the pixel mask are then used by the pixel store instruction to determine which pixels are to be updated as will be subsequently described.

In a preferred embodiment, the present invention supports distance (Z) values that are either 16-bits or 32-bits wide. The size of the Z-buffer values is independent of the pixel size which stores intensity and/or color information. The present invention is implemented to operate on 64-bit data words. Therefore, if 16-bit Z-values are used, four values can be checked simultaneously by the Z-buffer check instruction. When 32-bit Z-values are employed, two comparisons are performed simultaneously.

The Z-buffer check instruction may be conveniently characterized by the sequence of logical operations set forth below, in which the pixel mask comprises an array of 8-bits denoted as PM(0) ... PM(7), where PM(0) is the least significant bit.

For 16-bit Z-buffer values, consider src1, src2 and rdest as arrays of four 16-bit fields: src1(0) ... src1(3); src2(0) ... src2(3); and rdest(0) ... rdest(3); where (0) denotes the least significant field.
(1) PM←PM shifted right by 4 bits
(2) For i=0 to 3:
 (2a) PM(i+4)←src2(i)≦src1(i)
 (2b) rdest(i)←smaller of src2(i) and src1(i)
(3) MERGE←0.

For 32-bit Z-buffer values, consider src1, src2 and rdest as arrays of two 32-bit fields, but otherwise as above. In this case, the Z-buffer check instruction comprises the following sequence of operations:
(4) PM←PM shifted right by 2 bits
(5) For i=0 to 1
 (5a) PM(i+6)←src2(i)≦src1(i)
 (5b) rdest(i)←smaller of src2(i) and src1(i)
(6) MERGE←0.

FIG. 1 presents a flow diagram conceptually illustrating operation of the Z-buffer check instruction for 16-bit Z-buffer values. It is to be understood that FIG. 1 and the following description of the Z-buffer check instruction are conceptual in nature and are not meant to imply that the operational steps are performed sequentially in the manner described. Such description is merely a convenience to provide a full understanding of the logical and arithmetic operations involved. In fact, all of the described steps are performed substantially concurrently in parallel fashion such that the entire Z-buffer check instruction is executed within a single clock cycle of the processor in which it is implemented.

Beginning at step 10, the contents of the pixel mask are shifted right 4 bits. This shifts down the results of a previous Z-buffer check and prepares the pixel mask register to receive the results of the current instruction. At step 12, a loop counter (i) is initialized to 0. Then, at step 14, the Z-value retrieved from src2(i) is compared with that retrieved from src1(i). In the preferred implementation, src2 contains the "new" Z-value and src1 contains the "old" Z-value from the Z-buffer. That is, for pixel (i), src2(i) contains the Z-value of the surface being rendered, whereas src1(i) contains the Z-value of the same pixel for the closest of the previously rendered surfaces. If src2(i) is less than or equal to src1(i), i.e. if the new Z-value is less than (closer to the screen) than the old Z-value, the operation proceeds to step 16 where bit (i+4) of the pixel mask is loaded with a logical one. This provides an indication that the associated pixel should be updated to display the newly rendered surface. Proceeding to step 18, the value in src2(i), i.e. the new Z-value, is loaded into rdest(i). The location rdest(i) thus designates the newly computed Z-buffer.

If, at step 14, the new Z-value is found to be greater than the old Z-value, no pixel update is required and the operation proceeds to step 20 where bit (i+4) of the pixel mask is loaded with a logical zero. Then, in step 22, the value in src1(i), i.e. the old Z-value is loaded into rdest(i), thereby preserving the old Z-value for that pixel in the Z-buffer.

At step 24, the loop counter i is tested to determine if all four 16-bit Z-values have been checked. If not, the loop counter is incremented in step 26 and the loop is repeated for the next value of i. As previously explained, it is preferred that all four Z-values be checked in parallel rather than sequentially. If all four values have been checked, the MERGE register is loaded with all zeroes in step 28. The purpose and function of the MERGE register will be more fully described below. The Z-buffer check instruction is then exited at step 30.

FIG. 1 and the foregoing description are generally applicable to operation of the Z-buffer check instruction for 32-bit Z-buffer values. However, consistent with operations (4)–(6) above, it will be recognized that the pixel mask is shifted right by 2 bits in step 10 and that steps 14–22 are performed for two rather than four Z-values.

Computational efficiency can be increased by executing the Z-buffer check instruction in pipeline fashion. A pipelined Z-buffer check is performed substantially as described above, however, storage of the smaller of the new Z-value and old Z-value in location rdest(i) is accomplished on a subsequent instruction. Each Z-buffer check instruction therefore stores the result of the comparison performed in the preceding instruction while, at the same time, selecting the smaller of the presently compared Z-values for storage in the subsequent instruction.

Referring now to FIG. 4, a simplified functional block diagram of a system for implementing the present invention is shown. Operands are retrieved from a register file (not shown) comprising a set of addressable 64-bit registers. Both operands (i.e. src1 and src2 in the nomenclature used above) are asserted at 64-bit adder 50 and multiplexer 52. Both adder 50 and multiplexer 52 are configured as four 16-bit devices in parallel to facilitate parallel operation on four 16-bit Z-values or two 32-bit Z-values as described above.

Adder 50 subtracts one operand from the other, thereby functioning as a comparator. The carry out signals from adder 50 are asserted at multiplexer 52 to select the smaller of the two operands. The output of multiplexer 52 is asserted at input A of multiplexer 58. Multiplexer 58 determines the value to be sent to the destination register and is controlled by the opcode of the instruction being executed. In the case of the Z-buffer check instruction, input A is selected for assertion at result latch 60. This result is then written into the designated register of the register file. The results of the substractions performed in adder 50 also determine the most significant bits of 8-bit pixel mask 62 in accordance with logical operations (2a) and (5a) above.

It is to be understood that FIG. 4 presents a functional block diagram of an apparatus for implementing the present invention. It will be appreciated by those skilled in the art that a specific hardware implementation of the apparatus shown in FIG. 4 is matter of design choice that depends upon many factors generally unrelated to this invention. Accordingly, many circuit elements that would ordinarily be included in a practical processor but which do not relate to the function of the present invention have not been shown for the sake of clarity. While it is possible to implement this invention using discrete electrical components and/or commercially available integrated circuit devices, the most advantageous use of the invention is made in conjunction with a microprocessor chip. In particular, the present invention is especially useful in a reduced instruction set computing (RISC) processor or co-processor optimized for high throughput.

PIXEL STORE

Once the pixel mask is filled by the Z-buffer check instruction as described above, the contents of the pixel mask are used to selectively update those pixel locations of the frame buffer for which the corresponding pixel mask bit is set to a logical one, i.e. those pixels for which a newly rendered surface is closer to the screen than that already stored.

Newly calculated pixel values are stored in 64-bit floating point registers in a register file. Thus, depending on the pixel format, each data word stored in a register comprises two, four or eight pixel values. During operation of the pixel store instruction, the bit fields of the designated 64-bit register are selectively masked by the bits of the pixel mask. In conjunction with each pixel store instruction, the pixel mask is right shifted by the number of bits corresponding to the number of pixel values stored in a register. Thus, for a pixel size of 8-bits, the pixel mask is shifted by 8-bits; for a pixel size of 16-bits, the pixel mask is shifted by 4-bits; and for a pixel size of 32-bits, the pixel mask is shifted by 2-bits.

From the foregoing description, it will be appreciated that it is convenient to organize the pixel processing in groups of eight pixels. That is, either two or four Z-buffer check instructions are first performed (depending on the Z-value size) to fill the pixel mask. Then, depending on the pixel size, either one, two or four pixel store instructions are executed to update the frame buffer in accordance with the contents of the pixel mask.

Z-VALUE INTERPOLATION

The present invention provides a Z-buffer add instruction which implements linear interpolation of distance values. With the Z-buffer add instruction, 16-bit Z-buffers can use 32-bit distance interpolation as illustrated in FIG. 2. In this manner, two Z-values can be processed simultaneously in a single instruction. The Z-buffer add instruction is designed to add 32 bit values with each value treated as a fixed point real number with a 16-bit integer portion and a 16-bit fractional portion. Each of the two real numbers is truncated to a 16-bit integer when loaded into the MERGE register. With each Z-buffer add instruction, the MERGE register is shifted right by 16-bits. Normally, two Z-buffer add instructions are executed consecutively such that four interpolated Z-values are accumulated in the MERGE register.

It is conventional in 3-D graphics processing to treat a surface as comprising a set of interconnected polygons. In order to perform hidden surface elimination, a distance value must be computed for each pixel location on the surface. Since each polygon is planar, it can be seen that the distance value for each point on the polygon is provided by the following linear relationship:

$$Z = k_1 x + k_2 y + k_3 \qquad (7)$$

where Z is the Z-value associated with a pixel whose coordinates are (x,y) and $k_1$, $k_2$ and $k_3$ are constants.

It is convenient to initialize the Z-value at some point on the polygon, usually a vertex. If this initialized value is denoted as $Z_0$, it can be seen that the Z-value for the adjacent point on the same scan line, i.e. Y held constant and X incremented by 1, is given by:

$$Z_1 = k_1 + Z_0 \qquad (8)$$

Therefore, rather than performing two multiplies and three adds for each pixel, it is only necessary to compute a single initializing Z-value for each polygon and then perform linear interpolation requiring only a single add for every other point.

Referring to FIG. 2, the operation of the Z-buffer add instruction is shown diagrammatically. The locations src1 and src2 both contain two 32-bit fixed point numbers. Either src1 or src2 correspond to the Z-buffer with 16-bit values, while the other corresponds to the location of the appropriate interpolation constant. Since Z-values are stored as integer numbers, it will be recognized that the fractional portions of the Z-buffer source word are empty. The interpolation constant, on the other hand, is represented as a 32-bit fixed point real number so that excessive granularity is not introduced into the interpolated Z-values.

The results of the addition, still comprising two 32-bit fixed point real numbers, are directed to location rdest. The contents of the MERGE register are shifted right 16-bits in groups of 16-bits as shown by arrows 40 in FIG. 2. Thus, bits 48-63 are shifted into bits 32-47 and bits 16-31 are shifted into bits 0-15. The results of the addition operation are truncated such that the 16-bit integer portions of the two 32-bit results are loaded into the MERGE register in the bits vacated by the previous shift. That is, the 16 most significant bits of the two newly computed Z-values are loaded into bits 16-31 and 48-63, respectively. Since two Z-buffer add instructions are normally executed consecutively, the MERGE register ends up containing four Z-values.

In the case of 32-bit Z-buffer with 32-bit interpolation, no special Z-buffer add instruction is required since a normal add instruction will effectively perform two 32-bit adds in parallel. The distortion introduced by the fact that data is carried from the low-order 32-bits into the high-order 32-bits during interpolation is generally insignificant.

Referring to FIG. 4, real number additions as described above are performed in 64-bit adder 50. The results are asserted at input B of multiplexer 58 which, as discussed above, is controlled by the opcode of the instruction being executed. Input B is selected for the Z-buffer add instruction, thereby causing the interpolated Z-value to be asserted at result latch 60, and from there written into the designated register of the register file.

The results from adder 50 are also asserted at multiplexer 54, which is controlled by the pixel size and also by the opcode of the instruction being executed. Multiplexer 54 selects which fields of the MERGE register will be loaded with the results from adder 50 and which fields will be loaded with the shifted MERGE register.

The interpolated values accumulated in the MERGE register may be written to a register in the register file by an OR with MERGE instruction that enables input C of multiplexer 58, thereby directing the output of MERGE register 56 to result latch 60.

PIXEL INTERPOLATION

In a manner similar to the Z-value interpolation described above, the present invention implements linear interpolation of pixel color intensities (Gouraud shading) by means of a pixel add instruction. As previously discussed, the present invention supports 8-, 16-, and 32-bit pixel formats. The 8- and 16-bit pixel formats use 16-bit intensity interpolation. Being a 64-bit instruction, the pixel add performs four 16-bit interpolations at a time. The 32-bit pixel format uses 32-bit intensity interpolation. Consequently, the pixel add instruction performs two such 32-bit intensity interpolations at a time.

FIG. 3a illustrates the pixel add instruction when an 8-bit pixel format is employed. Since the instruction adds 16-bit values in this case, each value can be treated as a fixed point real number with an 8-bit integer portion and an 8-bit fractional portion. The real numbers are truncated to 8-bits when they are loaded into the MERGE register. With each such instruction, the MERGE register is shifted right by 8-bits. Two 8-bit pixel add instructions should be executed consecutively, one to interpolate for even numbered pixels, the next to interpolate for odd numbered pixels. The shifting of the MERGE register has the effect of merging the results of the two 8-bit pixel instructions.

FIG. 3b illustrates the pixel add instruction when 16-bit pixels are employed. Since the pixel add instruction adds 16-bit values in this case, each value can be treated as a fixed point real number with a 6-bit integer portion and 10-bit fractional portion. The real numbers are truncated to 6-bits when they are loaded into the MERGE register. With each 16-bit pixel add instruction, the MERGE register is shifted right by 6-bits. Normally, three such instructions are executed consecutively, one for each color represented in a pixel. The shifting of the MERGE register causes the results of consecutive instructions to be accumulated in the MERGE register. It should be noted that each one of the first set of 6-bit values loaded into the MERGE register is further truncated to 4-bits when it is shifted to the extreme right of the 16-bit pixel.

FIG. 3c illustrates the pixel add instruction for 32-bit pixels. In this case, the pixel add instruction adds 32-bit values with each value treated as a fixed point real number with an 8-bit integer portion and a 24-bit fractional portion. The real numbers are truncated to 8-bits when they are loaded into the MERGE register. With each 32-bit pixel add instruction, the MERGE register is shifted right by 8-bits. Normally, three such instructions are executed consecutively, one for each color represented in a pixel, although four consecutive instructions may be executed to merge all four pixel attributes. The shifting of the MERGE register causes the results of consecutively executed instructions to be accumulated in the MERGE register.

Referring again to FIG. 4, operation of the pixel add instruction proceeds in the same manner as discussed above in connection with the Z-buffer add instruction. That is, real number additions are performed in adder 50 and the results are asserted at both multiplexers 54 and 58. Input B of multiplexor 58 is again selected to direct the interpolated pixel value to the designated register in the register file. The appropriate bit fields of the interpolated pixel values are selected by multiplexer 54 to accumulate the truncated pixel intensities in merge register 56.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. In a digital processor for generating display data for rendering a graphical representation of an object on a display screen, said display screen comprising a plurality of pixels, said digital processor sequentially performing operations in synchronism with a clock signal, a method for interpolating a pixel attribute comprising the steps of:
   (a) providing a MERGE register having a plurality of bits divisible into a plurality of consecutive fields of plural bits;
   (b) retrieving a plurality of data words representing a selected attribute of a plurality of corresponding pixels, each of said data words representing a fixed point real number and having an integer portion represented by $N_i$ bits and a fractional portion represented by $N_f$ bits;
   (c) concurrently adding a predetermined interpolation constant to each of said plurality of data words, thereby providing a plurality of fixed point real number sums;
   (d) truncating each of the plurality of fixed point real number sums to an integer value with $N_i$ bits;
   (e) concurrently loading each of said plurality of truncated sums into respective non-adjacent fields of $N_i$ bits of said MERGE register;
   (f) shifting said MERGE register by $N_i$ bits so as to shift the contents of the MERGE register field by field; wherein steps (b), (c), (e) and (f) are performed substantially concurrently during a single cycle of said clock signal; and
   (g) repeating steps (b)-(e) to accumulate interleaved successive pluralities of truncated sums.

2. The method of claim 1 wherein said pixel attribute represents a distance from a corresponding point on said object to said display screen.

3. The method of claim 2 wherein said plurality of data words are retrieved from a Z-buffer.

4. The method of claim 1 wherein said pixel attribute represents a color intensity.

5. In a digital processor for sequentially performing operations on a plurality of data words in synchronism with a clock signal, a method for interpolating data values represented by said data words comprising the steps of:
   (a) providing a MERGE register having a plurality of bits divisible into a plurality of consecutive fields of plural bits;
   (b) retrieving a plurality of said data words, each of said data words representing a fixed point real number and having an integer portion represented by $N_i$ bits and a fractional portion represented by $N_f$ bits;
   (c) concurrently adding a predetermined interpolation constant to each of said plurality of data words, thereby providing a plurality of fixed point real number sums;
   (d) truncating each of the plurality of fixed point real number sums to an integer value with $N_i$ bits;

(e) concurrently loading each of said plurality of truncated sums into respective non-adjacent fields of $N_i$ bits of said MERGE register;

(f) shifting said MERGE register by $N_i$ bits so as to shift the contents of the MERGE register field by field; wherein steps (b), (c), (e) and (f) are performed substantially concurrently during a single cycle of said clock signal; and (g) repeating steps (b)–(e) to accumulate interleaved successive pluralities of truncated sums.

6. In a digital processor for sequentially performing operations on a plurality of data words in synchronism with a clock signal, a method for interpolating data values represented by said data words comprising the steps of:

(a) providing a MERGE register having a plurality of bits divisible into a plurality of consecutive fields of plural bits;

(b) retrieving a plurality of said data words, each of said data words comprising a predetermined number of bits N;

(c) concurrently adding a predetermined interpolation constant to each of said plurality of data words, thereby providing a plurality of sums;

(d) truncating each of the plurality of sums to a value with M bits, where $1 < M < N$;

(e) concurrently loading each of said plurality of truncated sums into respective non-adjacent fields of M bits of said MERGE register;

(f) shifting said MERGE register by M bits so as to shift the contents of the MERGE register field by field; wherein steps (b), (c), (e) and (f) are performed substantially concurrently during a single cycle of said clock signal; and (g) repeating steps (b)–(e) to accumulate interleaved successive pluralities of truncated sums.

* * * * *